US012469969B2

(12) United States Patent
Tai et al.

(10) Patent No.: US 12,469,969 B2
(45) Date of Patent: Nov. 11, 2025

(54) HYBRID ANTENNA STRUCTURE

(71) Applicant: Wistron NeWeb Corp., Hsinchu (TW)

(72) Inventors: Chih-Feng Tai, Hsinchu (TW); Kuei-Cheng Wang, Hsinchu (TW); De-Shao Yao, Hsinchu (TW); I-Jen Wang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 93 days.

(21) Appl. No.: 18/607,865

(22) Filed: Mar. 18, 2024

(65) Prior Publication Data

US 2025/0246810 A1 Jul. 31, 2025

(30) Foreign Application Priority Data

Jan. 29, 2024 (TW) ................................ 113103315

(51) Int. Cl.

| | |
|---|---|
| ***H01Q 5/20*** | (2015.01) |
| ***H01Q 1/38*** | (2006.01) |
| ***H01Q 1/48*** | (2006.01) |
| ***H01Q 13/10*** | (2006.01) |

(52) U.S. Cl.

CPC ................. *H01Q 5/20* (2015.01); *H01Q 1/38* (2013.01); *H01Q 1/48* (2013.01); *H01Q 13/106* (2013.01)

(58) Field of Classification Search

CPC .. H01Q 5/20; H01Q 1/38; H01Q 1/48; H01Q 13/106

See application file for complete search history.

(56) References Cited

U.S. PATENT DOCUMENTS

| | | | | |
|---|---|---|---|---|
| 11,831,086 | B2 * | 11/2023 | Chen | H01Q 13/10 |
| 12,034,223 | B2 * | 7/2024 | Chang | H01Q 1/22 |
| 2017/0207542 | A1 * | 7/2017 | Tseng | H01Q 1/48 |

FOREIGN PATENT DOCUMENTS

| | | | | |
|---|---|---|---|---|
| CN | 114188702 A * | 3/2022 | | H01Q 1/38 |
| TW | 202224265 A | 6/2022 | | |

* cited by examiner

*Primary Examiner* — Seung H Lee

(74) *Attorney, Agent, or Firm* — McClure, Qualey & Rodack, LLP

(57) ABSTRACT

A hybrid antenna structure includes a dielectric substrate, a metal element, a ground element, a feeding radiation element, and a proximity sensor. The dielectric substrate has a first surface and a second surface which are opposite to each other. The metal element is disposed on the second surface of the dielectric substrate. The metal element has a slot. The ground element is disposed on the first surface of the dielectric substrate. The feeding radiation element is disposed on the first surface of the dielectric substrate. The feeding radiation element is coupled to a feeding point. The feeding radiation element is adjacent to the slot of the metal element. The proximity sensor is coupled to the metal element, such that the metal element is configured as the sensing pad of the proximity sensor.

20 Claims, 11 Drawing Sheets

100

HYBRID ANTENNA STRUCTURE

CROSS REFERENCE TO RELATED APPLICATIONS

This application claims priority of Taiwan Patent Application No. 113103315 filed on Jan. 29, 2024, the entirety of which is incorporated by reference herein.

BACKGROUND OF THE INVENTION

Field of the Invention

The disclosure generally relates to a hybrid antenna structure, and more particularly, to a wideband hybrid antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. On the other hand, proximity sensors help mobile devices to pass the SAR (Specific Absorption Rate) regulations. Accordingly, it has become a critical challenge for antenna designers to design a small-size, wideband antenna element with the function of proximity sense.

BRIEF SUMMARY OF THE INVENTION

In an exemplary embodiment, the invention is directed to a hybrid antenna structure that includes a dielectric substrate, a metal element, a ground element, a feeding radiation element, and a proximity sensor. The dielectric substrate has a first surface and a second surface which are opposite to each other. The metal element is disposed on the second surface. The metal element has a slot. The ground element is disposed on the first surface. The feeding radiation element is disposed on the first surface. The feeding radiation element is coupled to a feeding point. The feeding radiation element is adjacent to the slot. The proximity sensor is coupled to the metal element, such that the metal element is configured as the sensing pad of the proximity sensor.

In some embodiments, the slot substantially has an L-shape.

In some embodiments, the hybrid antenna structure further includes an inductor. The proximity sensor is coupled to the metal element through the inductor.

In some embodiments, the hybrid antenna structure further includes a first metal piece, a second metal piece, and a first conductive via element. The first metal piece is coupled to the proximity sensor. The first metal piece and the second metal piece are disposed on the first surface of the dielectric substrate. The inductor is coupled between the first metal piece and the second metal piece. The first conductive via element penetrates the dielectric substrate. The second metal piece is coupled to the metal element through the first conductive via element.

In some embodiments, the inductance of the inductor is greater than or equal to 12 nH.

In some embodiments, the hybrid antenna structure further includes a capacitor. The ground element is coupled to the metal element through the capacitor.

In some embodiments, the hybrid antenna structure further includes a third metal piece and a second conductive via element. The third metal piece is disposed on the first surface. The capacitor is coupled between the third metal piece and the ground element. The second conductive via element penetrates the dielectric substrate. The third metal piece is coupled to the metal element through the second conductive via element.

In some embodiments, the capacitance of the capacitor is greater than or equal to 8 pF.

In some embodiments, the feeding radiation element has a vertical projection on the second surface. The whole vertical projection is inside the slot of the metal element.

In some embodiments, the hybrid antenna structure covers a first frequency band, a second frequency band, and a third frequency band. The first frequency band is from 2400 MHz to 2500 MHz. The second frequency band is from 5150 MHz to 5850 MHz. The third frequency band is from 5925 MHz to 7125 MHz.

In some embodiments, the length of the slot of the metal element is substantially equal to 0.25 wavelength of the first frequency band.

In some embodiments, the length of the feeding radiation element is substantially equal to 0.25 wavelength of the second frequency band or the third frequency band.

In some embodiments, the hybrid antenna structure further includes a first radiation element, a second radiation element, and a grounding radiation element. The first radiation element is coupled to the feeding radiation element. The second radiation element is coupled to the feeding radiation element. The second radiation element and the first radiation element substantially extend in opposite directions. The grounding radiation element is coupled to the ground element. The grounding radiation element is adjacent to the feeding radiation element and the first radiation element. The first radiation element, the second radiation element, and the grounding radiation element are disposed on the first surface of the dielectric substrate.

In some embodiments, the combination of the feeding radiation element, the first radiation element, and the second radiation element substantially has a T-shape.

In some embodiments, the hybrid antenna structure covers a first frequency band, a second frequency band, a third frequency band, and a fourth frequency band. The first frequency band is from 617 MHz to 960 MHz. The second frequency band is from 1710 MHz to 2690 MHz. The third frequency band is from 3300 MHz to 4800 MHz. The fourth frequency band is from 5100 MHz to 6000 MHz.

In some embodiments, the total length of the feeding radiation element and the first radiation element is substantially equal to 0.25 wavelength of the second frequency band.

In some embodiments, the total length of the feeding radiation element and the second radiation element is from 0.25 to 0.5 wavelength of the third frequency band.

In some embodiments, the length of the grounding radiation element is substantially equal to 0.25 wavelength of the fourth frequency band.

In some embodiments, a first coupling gap is formed between the grounding radiation element and the feeding radiation element, and the width of the first coupling gap is smaller than or equal to 4 mm. A second coupling gap is formed between the grounding radiation element and the first radiation element, and the width of the second coupling gap is smaller than or equal to 2 mm.

In some embodiments, the length of the metal element is greater than 30 mm, and the width of the metal element is greater than 6 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
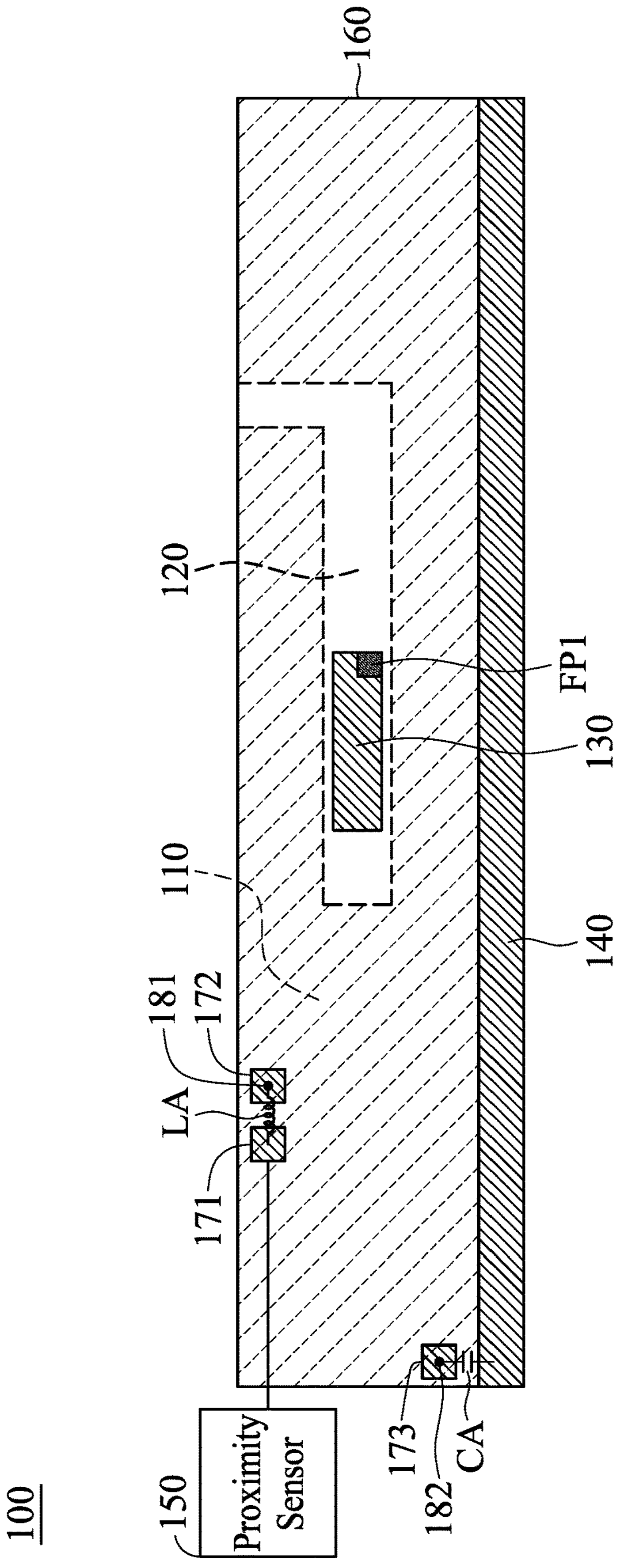
FIG. 1A is a top view of a hybrid antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
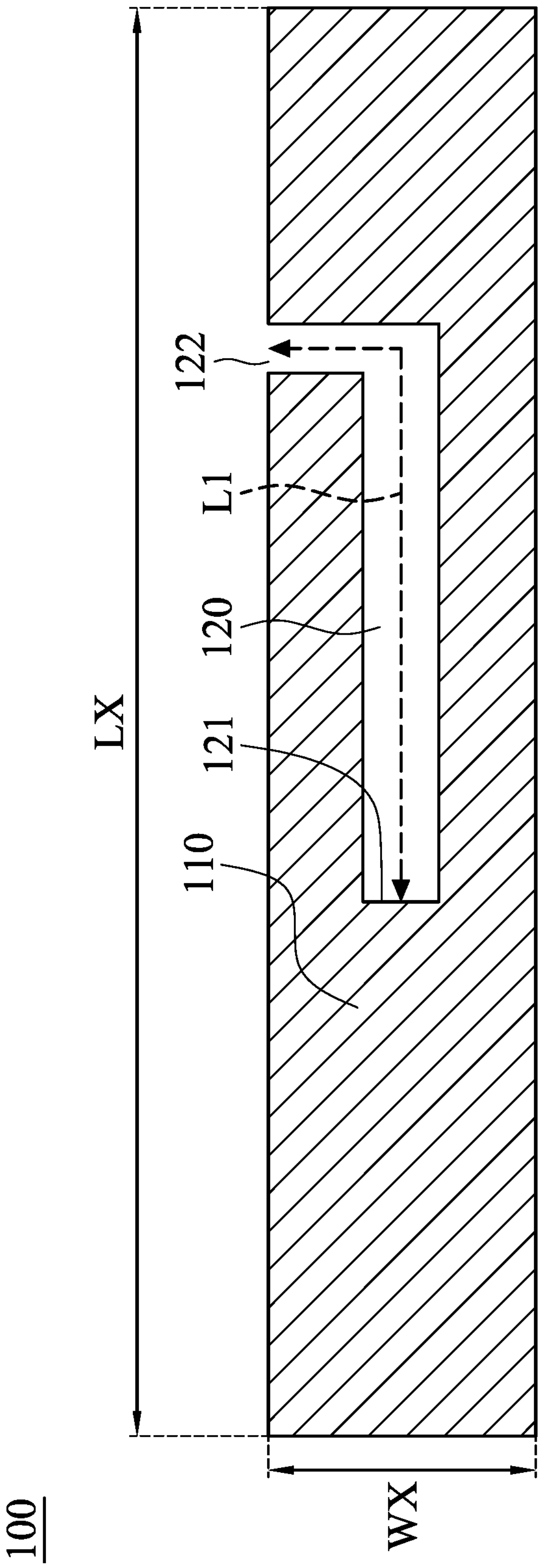
FIG. 1B is a partial view of elements of a hybrid antenna structure according to an embodiment of the invention.
Figure 1C:
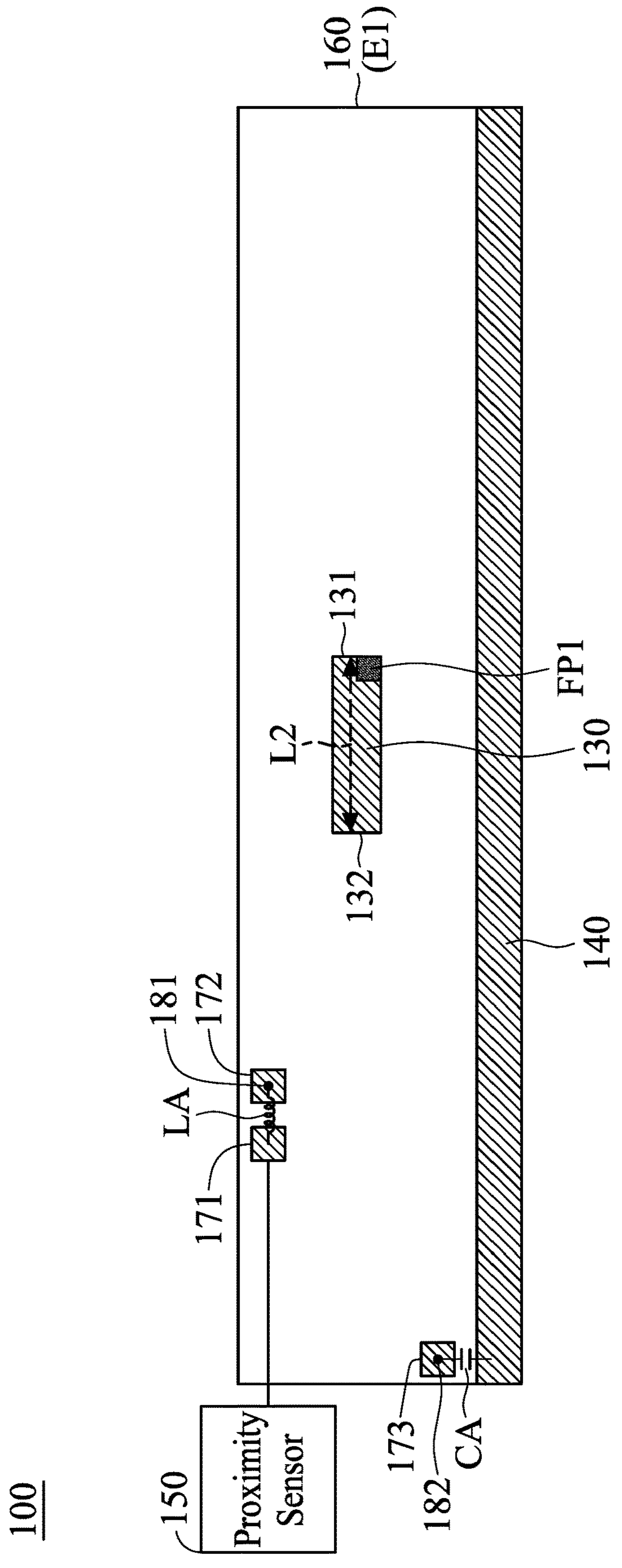
FIG. 1C is another partial view of elements of a hybrid antenna structure according to an embodiment of the invention.
Figure 1D:
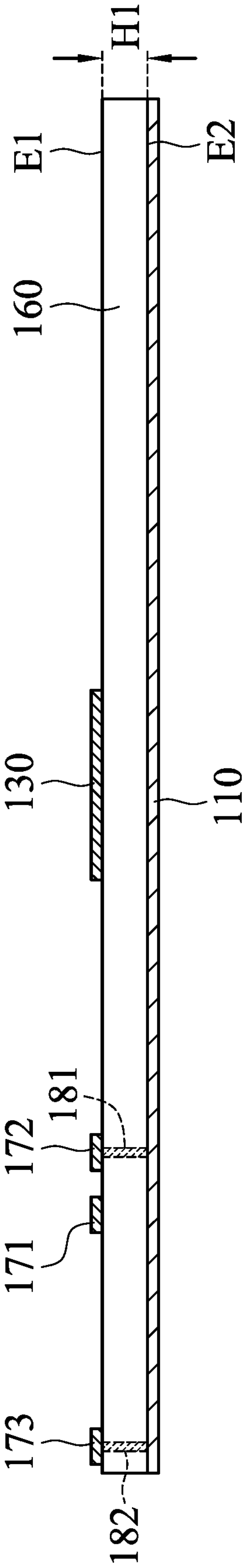
FIG. 1D is a side view of a hybrid antenna structure according to an embodiment of the invention.

FIG. 1A is a top view of a hybrid antenna structure 100 according to an embodiment of the invention. FIG. 1B is a partial view of elements of the hybrid antenna structure 100 according to an embodiment of the invention. FIG. 1C is another partial view of elements of the hybrid antenna structure 100 according to an embodiment of the invention. FIG. 1D is a side view of the hybrid antenna structure 100 according to an embodiment of the invention (but some elements are omitted and not displayed). Please refer to FIG. 1A, FIG. 1B, FIG. 1C and FIG. 1D together. The hybrid antenna structure 100 may be applied to a mobile device, such as a smart phone, a tablet computer, or a notebook computer. In the embodiment of FIG. 1A, FIG. 1B, FIG. 1C and FIG. 1D, the hybrid antenna structure 100 at least includes a metal element 110, a feeding radiation element 130, a ground element 140, a proximity sensor 150, and a dielectric substrate 160. The feeding radiation element 130 and the ground element 140 may all be made of metal materials, such as copper, silver, aluminum, iron, or their alloys.

The dielectric substrate 160 may be an FR4 (Flame Retardant 4) substrate, a PCB (Printed Circuit Board), or a FPC (Flexible Printed Circuit). The dielectric substrate 160 has a first surface E1 and a second surface E2 which are opposite to each other. The feeding radiation element 130 and the ground element 140 may be disposed on the first surface E1 of the dielectric substrate 160. The metal element 110 may be disposed on the second surface E2 of the dielectric substrate 160.

The metal element 110 has a slot 120. For example, the slot 120 of the metal element 110 may substantially have an L-shape. In this embodiment, the slot 120 of the metal element 110 is an open slot. Specifically, the slot 120 may have a closed end 121 and an open end 122 away from each other. It should be noted that the invention is not limited to the design of the open slot. In alternative embodiments, the slot 120 of the metal element 110 is modified to a closed slot with two closed ends. In some embodiments, the hybrid antenna structure 100 further includes a nonconductive material (not shown) which fills the slot 120 of the metal element 110, to make it waterproof and dustproof.

For example, the feeding radiation element 130 may substantially have a straight-line shape, which may be substantially parallel to the ground element 140. Specifically, the feeding radiation element 130 has a first end 131 and a second end 132. The first end 131 of the feeding radiation element 130 is coupled to the feeding point FP1. The second end 132 of the feeding radiation element 130 is an open end. The feeding point FP1 may be further coupled to a signal source (not shown). For example, the signal source may be an RF (Radio Frequency) module for exciting the hybrid antenna structure 100. The feeding radiation element 130 is adjacent to the slot 120 of the metal element 110. It should be noted that the term "adjacent" or "close" throughout the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0). In some embodiments, the feeding radiation element 130 has a vertical projection on the second surface E2 of the dielectric substrate 160, and the whole vertical projection is inside the slot 120 of the metal element 110.

The ground element 140 disposed opposite to the metal element 110. For example, the area of the ground element 140 may be much smaller than the area of the metal element 110. In some embodiments, the ground element 140 is coupled to the metal element 110. However, the invention is not limited thereto. In alternative embodiments, the ground element 140 is floating.

The proximity sensor 150 is coupled to the metal element 110, such that the metal element 110 is configured as the sensing pad of the proximity sensor 150. It should be noted that the connection means between the metal element 110 and the proximity sensor 150 are not limited in the invention. For example, the aforementioned connection means may belong to direct connections or indirect connections. Since the metal element 110 has a relatively large area, the detectable distance of the proximity sensor 150 can be effectively increased.

In some embodiments, the hybrid antenna structure 100 further includes an inductor LA, a first metal piece 171, a second metal piece 172, and a first conductive via element 181. For example, each of the first metal piece 171 and the second metal piece 172 may substantially have a small square shape, and the first conductive via element 181 may be made of a metal material. The first metal piece 171 and the second metal piece 172 are disposed on the first surface E1 of the dielectric substrate 160. The first metal piece 171 is coupled to the proximity sensor 150. The inductor LA is coupled between the first metal piece 171 and the second metal piece 172. The first conductive via element 181 penetrates the dielectric substrate 160, so that the second metal piece 172 can be coupled to the metal element 110 through the first conductive via element 181. In other words, the proximity sensor 150 can be further coupled to the metal element 110 through the inductor LA. It should be understood that the inductor LA, the first metal piece 171, the second metal piece 172, and the first conductive via element 181 are merely optional components, which are omitted in other embodiments.

In some embodiments, the hybrid antenna structure 100 further includes a capacitor CA, a third metal piece 173, and a second conductive via element 182. For example, the third metal piece 173 may substantially have another small square shape, and the second conductive via element 182 may be made of a metal material. The third metal piece 173 is disposed on the first surface E1 of the dielectric substrate 160. The capacitor CA is coupled between the third metal piece 173 and the ground element 140. The second conductive via element 182 penetrates the dielectric substrate 160, such that the third metal piece 173 is coupled to the metal element 110 through the second conductive via element 182. In other words, the ground element 140 can be further coupled to the metal element 110 through the capacitor CA. It should be understood that the capacitor CA, the third metal piece 173, and the second conductive via element 182 are merely optional components, which are omitted in other embodiments.

Figure 2:
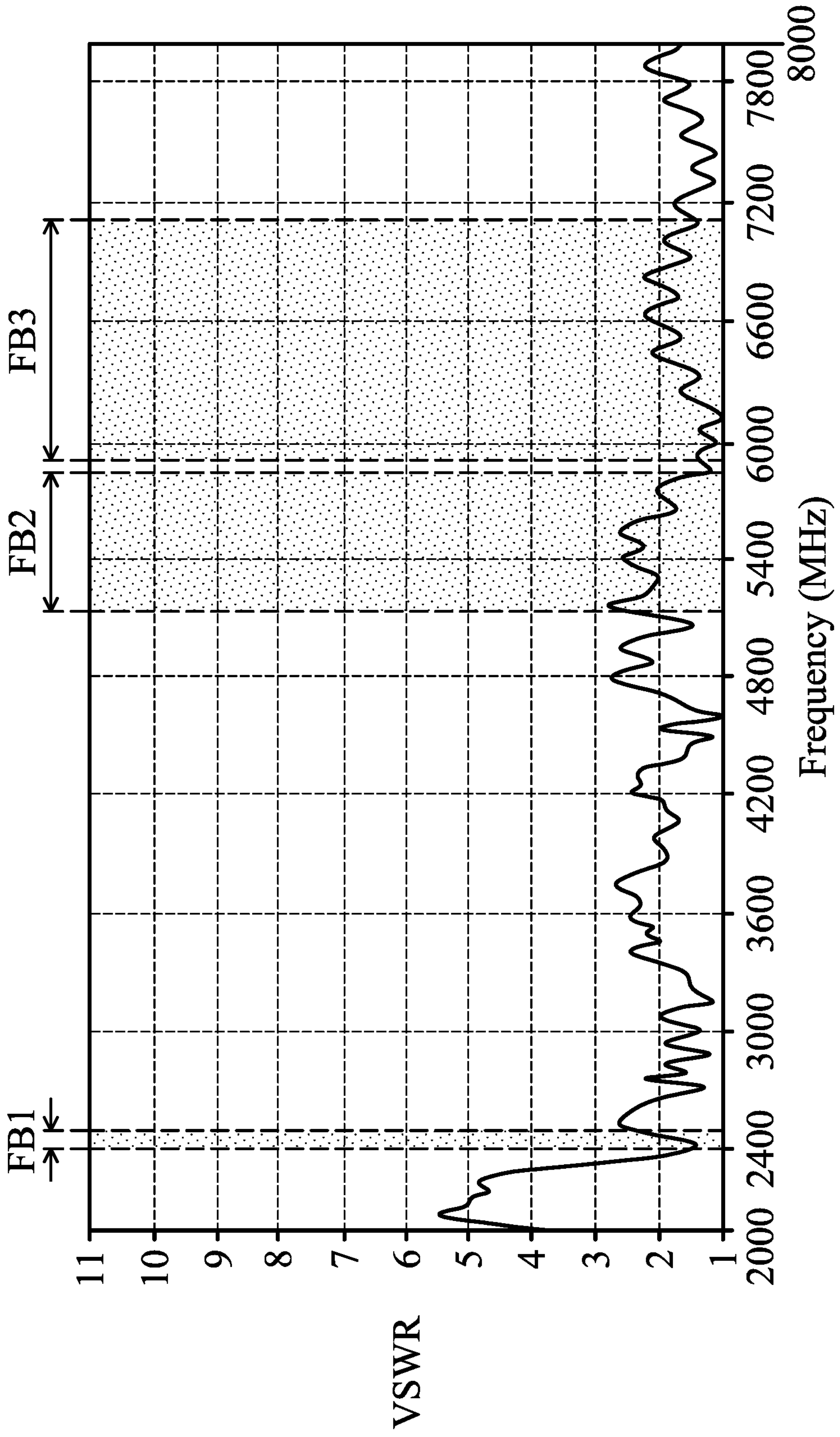
FIG. 2 is a diagram of VSWR (Voltage Standing Wave Ratio) of a hybrid antenna structure according to an embodiment of the invention.

FIG. 2 is a diagram of VSWR (Voltage Standing Wave Ratio) of the hybrid antenna structure 100 according to an embodiment of the invention. The horizontal axis represents the operational frequency (MHz), and the vertical axis represents the VSWR. According to the measurement of FIG. 2, the hybrid antenna structure 100 can cover a first frequency band FB1, a second frequency band FB2, and a third frequency band FB3. For example, the first frequency band FB1 may be from 2400 MHz to 2500 MHz, the second frequency band FB2 may be from 5150 MHz to 5850 MHz, and the third frequency band FB3 may be from 5925 MHz to 7125 MHz. Therefore, the hybrid antenna structure 100 can support the wideband operations of both conventional WLAN (Wireless Local Area Networks) and next-generation Wi-Fi 6E.

In some embodiments, the operational principles of the hybrid antenna structure 100 will be described below. The slot 120 of the metal element 110 can be excited by the feeding radiation element 130 using a coupling mechanism, so as to generate the first frequency band FB1 and the second frequency band FB2. The feeding radiation element 130 can be further excited to generate the second frequency band FB2 and/or the third frequency band FB3. According to practical measurements, the inductor LA is configured to increase the detectable distance of the proximity sensor 150, and the capacitor CA is configured to prevent the direct currents of the proximity sensor 150 from flowing back. With the proposed design, because the metal element 110 is well integrated, the hybrid antenna structure 100 can provide both the functions of wideband operation and proximity sense, without additionally increasing the overall device size.

In some embodiments, the element sizes and element parameters of the hybrid antenna structure 100 will be described below. The length LX of the metal element 110 may be greater than 30 mm, such as about 40 mm. The width WX of the metal element 110 may be greater than 6 mm, such as about 9 mm. The length L1 of the slot 120 of the metal element 110 may be substantially equal to 0.25 wavelength (λ/4) of the first frequency band FB1 of the hybrid antenna structure 100. The length L2 of the feeding radiation element 130 may be substantially equal to 0.25 wavelength (λ/4) of the second frequency band FB2 or the third frequency band FB3 of the hybrid antenna structure 100. The thickness H1 of the dielectric substrate 160 may be from 0.2 mm to 0.8 mm. The inductance of the inductor LA may be greater than or equal to 12 nH. The capacitance of the capacitor CA may be greater than or equal to 8 pF. The above ranges of element sizes and element parameters are calculated and obtained according to many experimental results, and they help to optimize the operational bandwidth and impedance matching of the hybrid antenna structure 100, and also to maximize the detectable distance of the proximity sensor 150.

The following embodiments will introduce different configurations and detailed structural features of the hybrid antenna structure 100. It should be understood that these figures and descriptions are merely exemplary, rather than limitations of the invention.

Figure 3A:
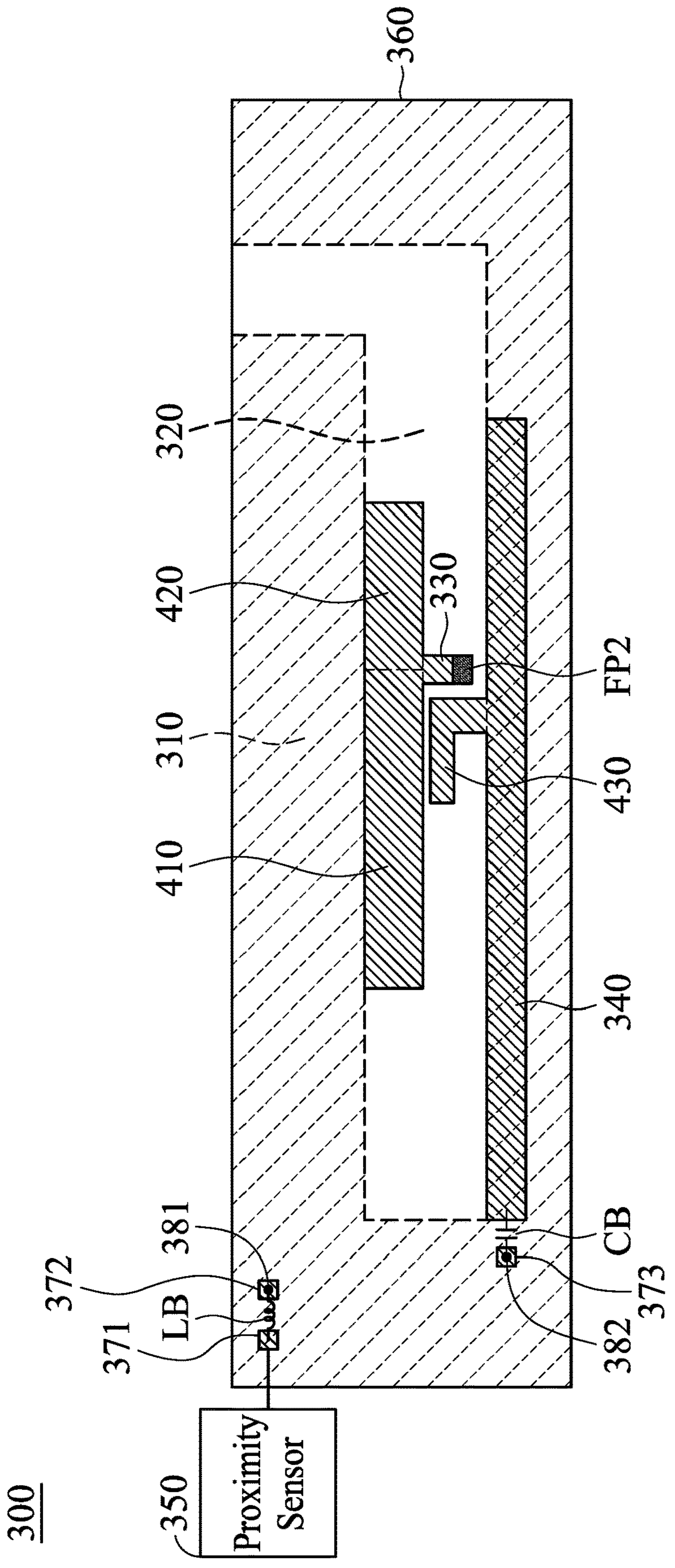
FIG. 3A is a top view of a hybrid antenna structure according to an embodiment of the invention.
Figure 3B:
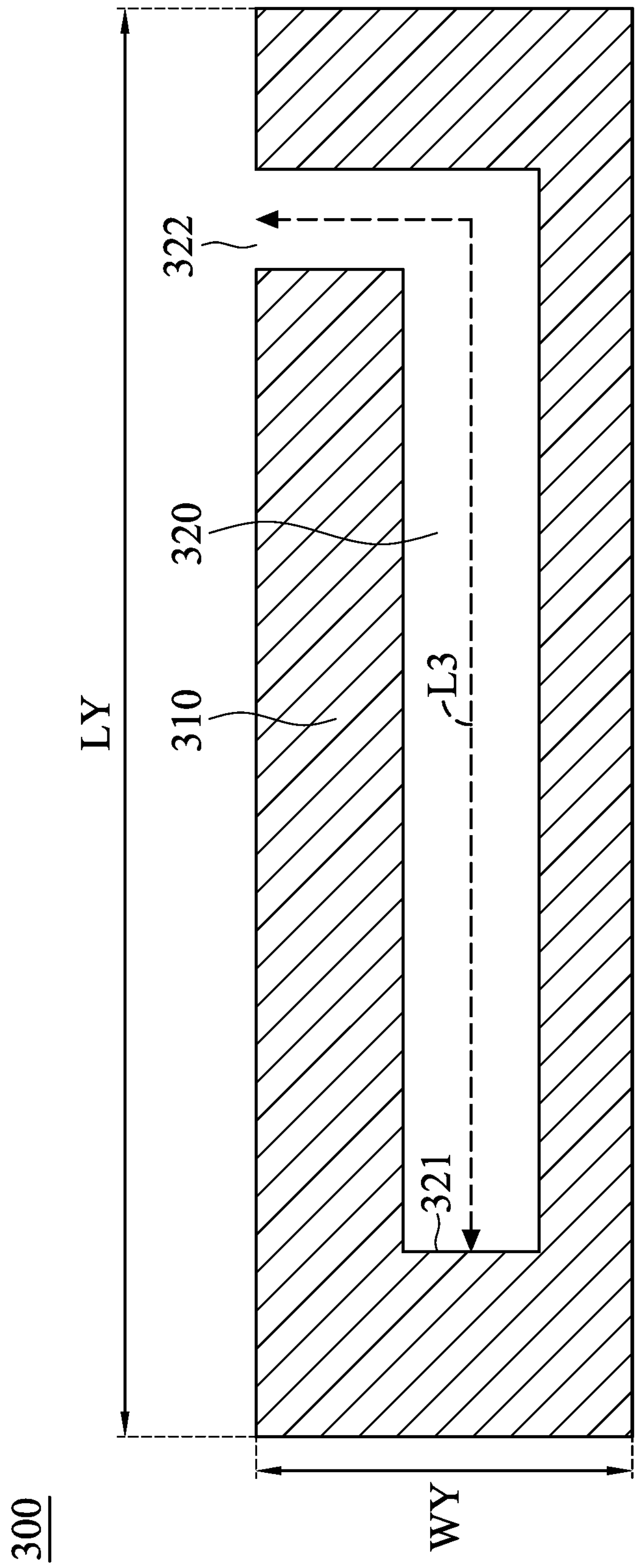
FIG. 3B is a partial view of elements of a hybrid antenna structure according to an embodiment of the invention.
Figure 3C:
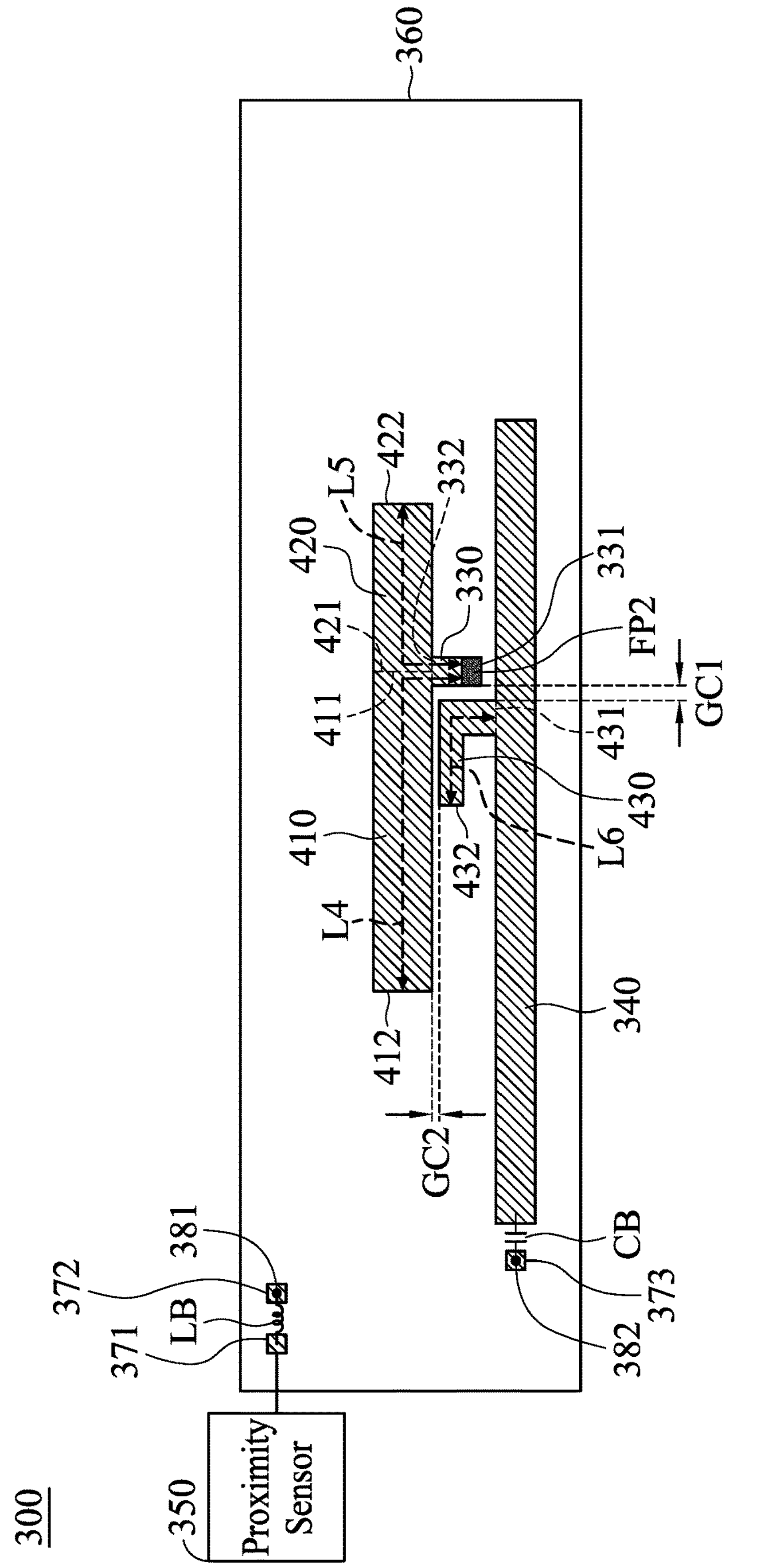
FIG. 3C is another partial view of elements of a hybrid antenna structure according to an embodiment of the invention.
Figure 3D:
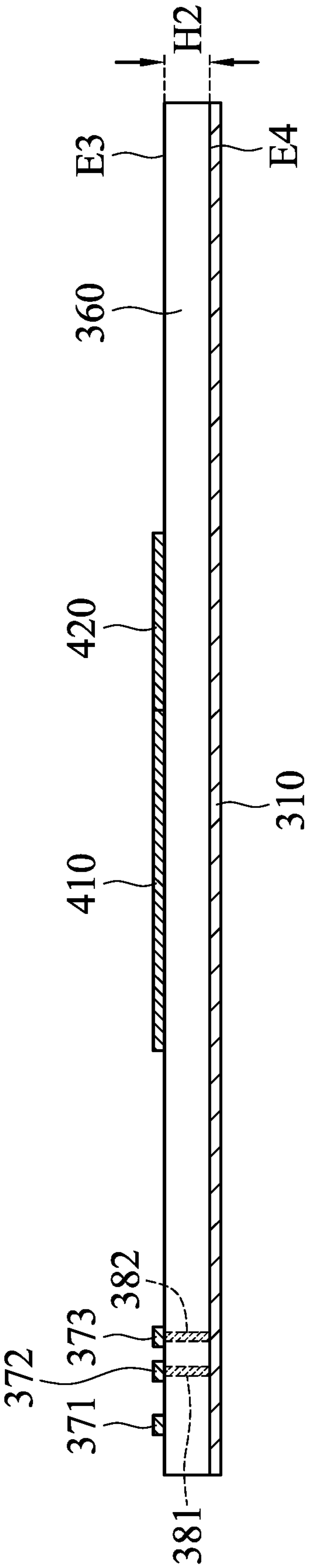
FIG. 3D is a side view of a hybrid antenna structure according to an embodiment of the invention.

FIG. 3A is a top view of a hybrid antenna structure 300 according to an embodiment of the invention. FIG. 3B is a partial view of elements of the hybrid antenna structure 300 according to an embodiment of the invention. FIG. 3C is another partial view of elements of the hybrid antenna structure 300 according to an embodiment of the invention. FIG. 3D is a side view of the hybrid antenna structure 300 according to an embodiment of the invention (but some elements are omitted and not displayed). Please refer to FIG. 3A, FIG. 3B, FIG. 3C and FIG. 3D together. In the embodiment of FIG. 3A, FIG. 3B, FIG. 3C and FIG. 3D, the hybrid antenna structure 300 at least includes a metal element 310, a feeding radiation element 330, a ground element 340, a proximity sensor 350, a dielectric substrate 360, a first radiation element 410, a second radiation element 420, and a grounding radiation element 430. The metal element 310, the feeding radiation element 330, the ground element 340, the first radiation element 410, the second radiation element 420, and the grounding radiation element 430 may all be made of metal materials.

The dielectric substrate 360 has a first surface E3 and a second surface E4 which are opposite to each other. The feeding radiation element 330, the ground element 340, the first radiation element 410, the second radiation element 420, and the grounding radiation element 430 may all be disposed on the first surface E3 of the dielectric substrate 360. The metal element 310 may be disposed on the second surface E4 of the dielectric substrate 360.

The metal element 310 has a slot 320. For example, the slot 320 of the metal element 310 may substantially have an L-shape. Specifically, the slot 320 has a closed end 321 and an open end 322 away from each other.

For example, the feeding radiation element 330 may substantially have a straight-line shape. Specifically, the feeding radiation element 330 has a first end 331 and a second end 332. The first end 331 of the feeding radiation element 330 is coupled to the feeding point FP2. The feeding point FP2 may be further coupled to a signal source (not shown).

The ground element 340 disposed opposite to the metal element 310. In some embodiments, the ground element 340 is coupled to the metal element 310. However, the invention is not limited thereto. In alternative embodiments, the ground element 340 is floating.

The proximity sensor 350 is coupled to the metal element 310, such that the metal element 310 is configured as the sensing pad of the proximity sensor 350. Since the metal element 310 has a relatively large area, the detectable distance of the proximity sensor 350 can be effectively increased.

For example, the first radiation element 410 may substantially have a relatively long straight-line shape, which may be substantially parallel to the ground element 340. Specifically, the first radiation element 410 has a first end 411 and a second end 412. The first end 411 of the first radiation element 410 is coupled to the second end 332 of the feeding radiation element 330. The second end 412 of the first radiation element 410 is an open end.

For example, the second radiation element 420 may substantially have a relatively short straight-line shape (compared with the first radiation element 410), which may also be substantially parallel to the ground element 340. Specifically, the second radiation element 420 has a first end 421 and a second end 422. The first end 421 of the second radiation element 420 is coupled to the second end 332 of the feeding radiation element 330 and the first end 411 of the first radiation element 410. The second end 422 of the second radiation element 420 is an open end. In some embodiments, the second end 422 of the second radiation element 420 and the second end 412 of the first radiation element 410 substantially extend in opposite directions and away from each other. In some embodiments, the combination of the feeding radiation element 330, the first radiation element 410, and the second radiation element 420 substantially has a T-shape.

For example, the grounding radiation element 430 may substantially have another L-shape. Specifically, the grounding radiation element 430 has a first end 431 and a second end 432. The first end 431 of the grounding radiation element 430 is coupled to the ground element 340. The second end 432 of the grounding radiation element 430 is an open end. In some embodiments, the second end 432 of the grounding radiation element 430 and the second end 412 of the first radiation element 410 substantially extend in the same direction. In some embodiments, the grounding radiation element 430 is adjacent to both the feeding radiation element 330 and the first radiation element 410. The first coupling gap GC1 may be formed between the grounding radiation element 430 and the feeding radiation element 330. The second coupling gap GC2 may be formed between the grounding radiation element 430 and the first radiation element 410.

The feeding radiation element 330, the first radiation element 410, the second radiation element 420, and the grounding radiation element 430 are all adjacent to the slot 320 of the metal element 310. In some embodiments, the feeding radiation element 330, the first radiation element 410, the second radiation element 420, and the grounding radiation element 430 have four vertical projections on the second surface E4 of the dielectric substrate 360. The aforementioned vertical projections may be completely inside the slot 320 of the metal element 310.

In some embodiments, the hybrid antenna structure 300 further includes an inductor LB, a first metal piece 371, a second metal piece 372, and a first conductive via element 381. The first metal piece 371 and the second metal piece 372 are disposed on the first surface E3 of the dielectric substrate 360. The first metal piece 371 is coupled to the proximity sensor 350. The inductor LB is coupled between the first metal piece 371 and the second metal piece 372. The first conductive via element 381 penetrates the dielectric substrate 360, so that the second metal piece 372 can be coupled to the metal element 310 through the first conductive via element 381.

In some embodiments, the hybrid antenna structure 300 further includes a capacitor CB, a third metal piece 373, and a second conductive via element 382. The third metal piece 373 is disposed on the first surface E3 of the dielectric substrate 360. The capacitor CB is coupled between the third metal piece 373 and the ground element 340. The second conductive via element 382 penetrates the dielectric substrate 360, so that the third metal piece 373 can be coupled to the metal element 310 through the second conductive via element 382.

Figure 4:
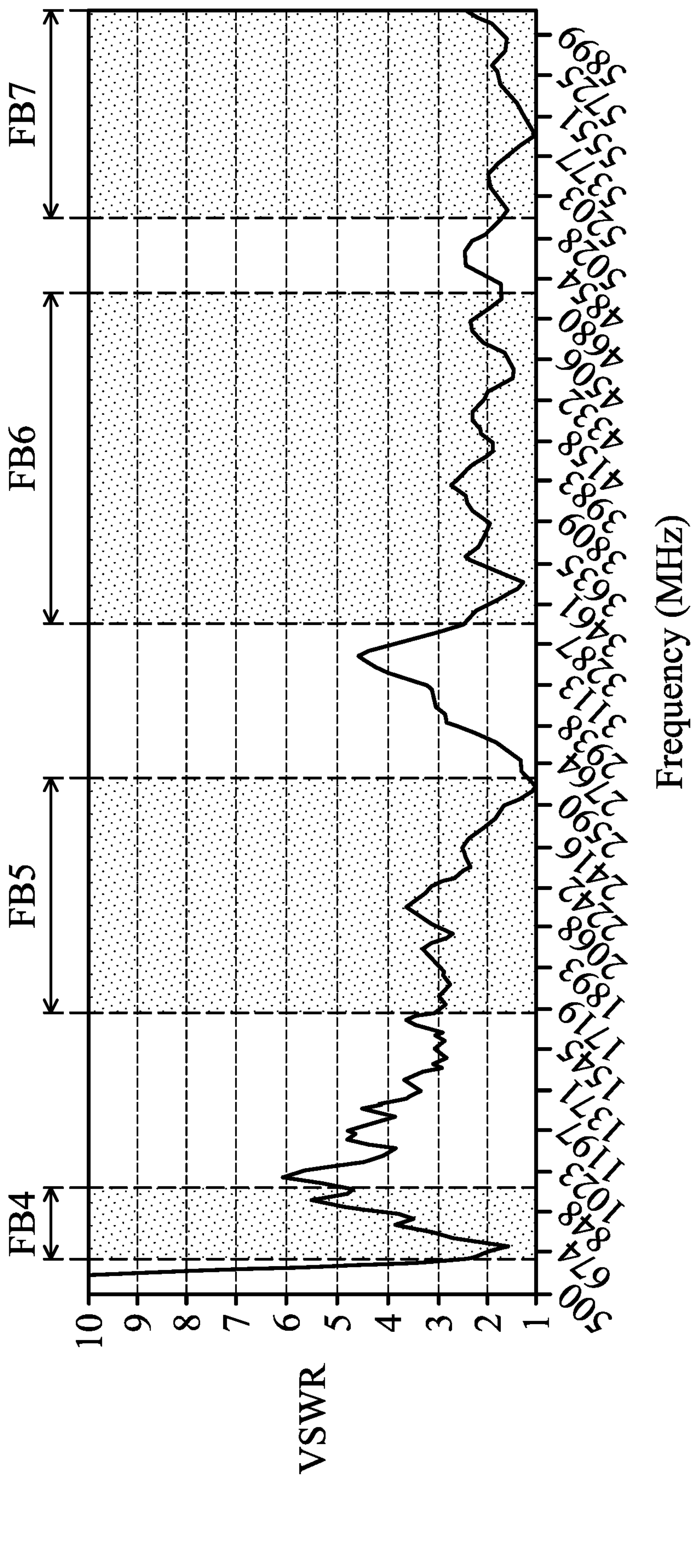
FIG. 4 is a diagram of VSWR of a hybrid antenna structure according to an embodiment of the invention.

FIG. 4 is a diagram of VSWR of the hybrid antenna structure 300 according to an embodiment of the invention. The horizontal axis represents the operational frequency (MHz), and the vertical axis represents the VSWR. According to the measurement of FIG. 4, the hybrid antenna structure 300 can cover a first frequency band FB4, a second frequency band FB5, a third frequency band FB6, and a fourth frequency band FB7. For example, the first frequency band FB4 may be from 617 MHz to 960 MHz, the second frequency band FB5 may be from 1710 MHz to 2690 MHz, the third frequency band FB6 may be from 3300 MHz to 4800 MHz, and the fourth frequency band FB7 may be from 5100 MHz to 6000 MHz. Therefore, the hybrid antenna structure 300 can support the wideband operations of LTE (Long Term Evolution).

In some embodiments, the operational principles of the hybrid antenna structure 300 will be described below. The slot 320 of the metal element 310 can be excited to generate the first frequency band FB4. The feeding radiation element 330 and the first radiation element 410 can be excited to generate the second frequency band FB5. The feeding radiation element 330 and the second radiation element 420 can be excited to generate the third frequency band FB6. The grounding radiation element 430 can be excited by the feeding radiation element 330 using a coupling mechanism, so as to generate the fourth frequency band FB7. Also, the inductor LB is configured to increase the detectable distance of the proximity sensor 350, and the capacitor CB is configured to prevent the direct currents of the proximity sensor 350 from flowing back.

In some embodiments, the element sizes and element parameters of the hybrid antenna structure 300 will be described below. The length LY of the metal element 310 may be greater than 65 mm, such as about 76 mm. The width WY of the metal element 310 may be greater than 20 mm, such as about 27 mm. The length L3 of the slot 320 of the metal element 310 may be substantially equal to 0.25 wavelength (λ/4) of the first frequency band FB4 of the hybrid antenna structure 300. The total length L4 of the feeding radiation element 330 and the first radiation element 410 may be substantially equal to 0.25 wavelength (λ/4) of the second frequency band FB5 of the hybrid antenna structure 300. The total length L5 of the feeding radiation element 330 and the second radiation element 420 may be from 0.25 to 0.5 wavelength (λ/4~λ/2) of the third frequency band FB6 of the hybrid antenna structure 300. The length L6 of the grounding radiation element 430 may be substantially equal to 0.25 wavelength (λ/4) of the fourth frequency band FB7 of the hybrid antenna structure 300. The thickness H2 of the dielectric substrate 360 may be from 0.2 mm to 0.8 mm. The width of the first coupling gap GC1 may be smaller than or equal to 4 mm. The width of the second coupling gap GC2 may be smaller than or equal to 2 mm. The inductance of the inductor LB may be greater than or equal to 12 nH. The capacitance of the capacitor CB may be greater than or equal to 8 pF. The above ranges of element sizes and element parameters are calculated and obtained according to many experimental results, and they help to optimize the operational bandwidth and impedance matching of the hybrid antenna structure 300, and also to maximize the detectable distance of the proximity sensor 350.

Figure 5:
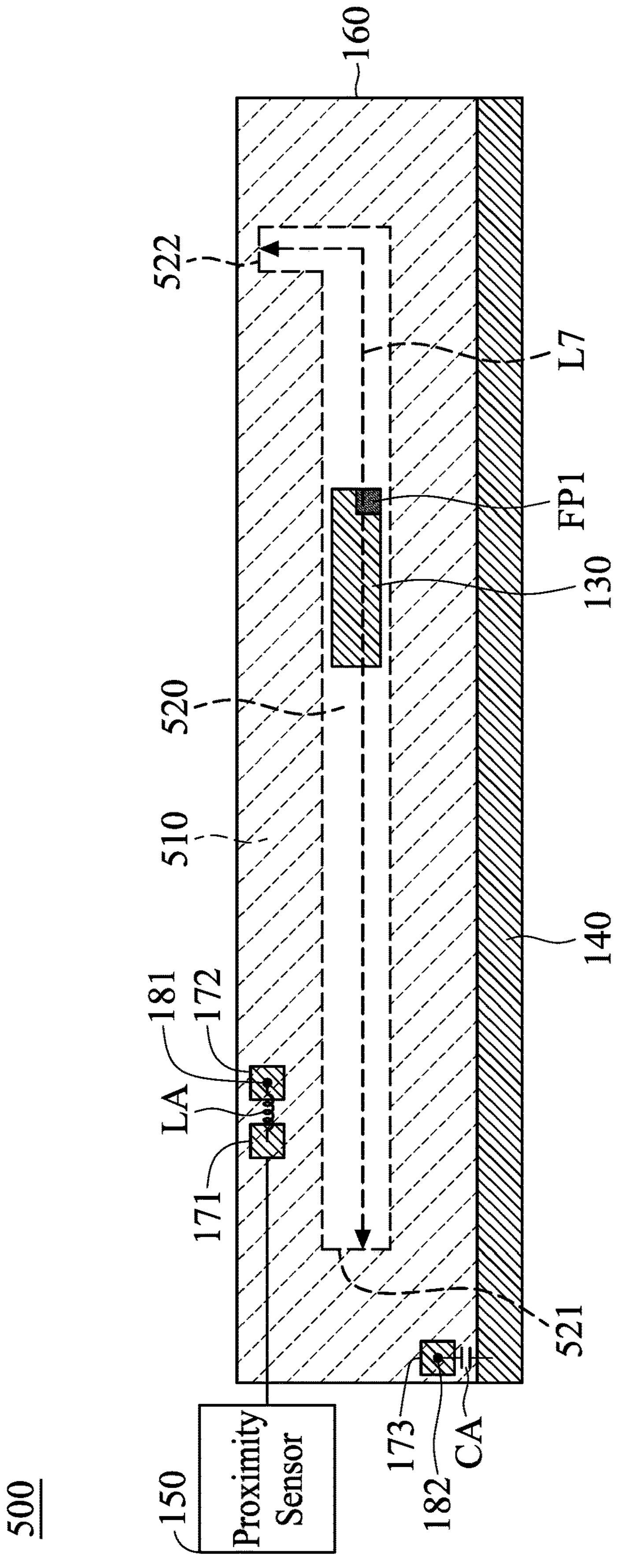
FIG. 5 is a top view of a hybrid antenna structure according to an embodiment of the invention.

FIG. 5 is a top view of a hybrid antenna structure 500 according to an embodiment of the invention. FIG. 5 is similar to FIG. 1A. In the embodiment of FIG. 5, a metal element 510 of the hybrid antenna structure 500 has a slot 520. The slot 520 belongs to an L-shaped closed slot with two closed ends 521 and 522 away from each other. According to practical measurements, the hybrid antenna structure 500 can also cover the first frequency band FB1, the second frequency band FB2, and the third frequency band FB3 as mentioned above. For example, the length L7 of the slot 520 of the metal element 510 may substantially equal to 0.5 wavelength (λ/2) of the first frequency band FB1 of the hybrid antenna structure 500. Because of the multiple-frequency effect, the slot 520 of the metal element 510 can also contribute to the second frequency band FB2 and the third frequency band FB3 of the hybrid antenna structure 500. Other features of the hybrid antenna structure 500 of FIG. 5 are similar to those of the hybrid antenna structure 100 of FIG. 1A, FIG. 1B, FIG. 1C and FIG. 1D. Therefore, the two embodiments can achieve similar levels of performance.

The invention proposes a novel hybrid antenna structure. In comparison to the conventional design, the invention at least has the advantages of increasing the operational bandwidth, reducing the device size, and extending the detectable distance of the proximity sensor. Therefore, it is suitable for application in a variety of communication devices.

Note that the above element sizes, element shapes, element parameters, and frequency ranges are not limitations of the invention. An antenna designer can fine-tune these settings or values in order to meet specific requirements. It should be understood that the hybrid antenna structure of the invention is not limited to the configurations depicted in FIGS. 1-5. The invention may merely include any one or more features of any one or more embodiments of FIGS. 1-5. In other words, not all of the features displayed in the figures should be implemented in the hybrid antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hybrid antenna structure, comprising:

a dielectric substrate, having a first surface and a second surface opposite to each other;

a metal element, disposed on the second surface, and having a slot;

a ground element, disposed on the first surface;

a feeding radiation element, disposed on the first surface, and coupled to a feeding point, wherein the feeding radiation element is adjacent to the slot; and a proximity sensor, coupled to the metal element, such that the metal element is configured as a sensing pad of the proximity sensor.

2. The hybrid antenna structure as claimed in claim 1, wherein the slot substantially has an L-shape.

3. The hybrid antenna structure as claimed in claim 1, further comprising:

an inductor, wherein the proximity sensor is coupled through the inductor to the metal element.

4. The hybrid antenna structure as claimed in claim 3, further comprising:

a first metal piece, coupled to the proximity sensor;

a second metal piece, wherein the first metal piece and the second metal piece are disposed on the first surface of the dielectric substrate, and the inductor is coupled between the first metal piece and the second metal piece; and a first conductive via element, penetrating the dielectric substrate, wherein the second metal piece is coupled through the first conductive via element to the metal element.

5. The hybrid antenna structure as claimed in claim 3, wherein an inductance of the inductor is greater than or equal to 12 nH.

6. The hybrid antenna structure as claimed in claim 1, further comprising:

a capacitor, wherein the ground element is coupled through the capacitor to the metal element.

7. The hybrid antenna structure as claimed in claim 6, further comprising:

a third metal piece, disposed on the first surface, wherein the capacitor is coupled between the third metal piece and the ground element; and a second conductive via element, penetrating the dielectric substrate, wherein the third metal piece is coupled through the second conductive via element to the metal element.

8. The hybrid antenna structure as claimed in claim 6, wherein a capacitance of the capacitor is greater than or equal to 8 pF.

9. The hybrid antenna structure as claimed in claim 1 wherein the feeding radiation element has a vertical projection on the second surface, and the whole vertical projection is inside the slot of the metal element.

10. The hybrid antenna structure as claimed in claim 1, wherein the hybrid antenna structure covers a first frequency band, a second frequency band, and a third frequency band, the first frequency band is from 2400 MHz to 2500 MHz, the second frequency band is from 5150 MHz to 5850 MHz, and the third frequency band is from 5925 MHz to 7125 MHz.

11. The hybrid antenna structure as claimed in claim 10, wherein a length of the slot of the metal element is substantially equal to 0.25 wavelength of the first frequency band.

12. The hybrid antenna structure as claimed in claim 10, wherein a length of the feeding radiation element is substantially equal to 0.25 wavelength of the second frequency band or the third frequency band.

13. The hybrid antenna structure as claimed in claim 1, further comprising:

a first radiation element, coupled to the feeding radiation element;

a second radiation element, coupled to the feeding radiation element, wherein the second radiation element and the first radiation element substantially extend in opposite directions; and a grounding radiation element, coupled to the ground element, wherein the grounding radiation element is adjacent to the feeding radiation element and the first radiation element;

wherein the first radiation element, the second radiation element, and the grounding radiation element are disposed on the first surface of the dielectric substrate.

14. The hybrid antenna structure as claimed in claim 13, wherein a combination of the feeding radiation element, the first radiation element, and the second radiation element substantially has a T-shape.

15. The hybrid antenna structure as claimed in claim 13, wherein the hybrid antenna structure covers a first frequency band, a second frequency band, a third frequency band, and a fourth frequency band, the first frequency band is from 617 MHz to 960 MHz, the second frequency band is from 1710 MHz to 2690 MHz, the third frequency band is from 3300 MHz to 4800 MHz, and the fourth frequency band is from 5100 MHz to 6000 MHz.

16. The hybrid antenna structure as claimed in claim 15, wherein a total length of the feeding radiation element and the first radiation element is substantially equal to 0.25 wavelength of the second frequency band.

17. The hybrid antenna structure as claimed in claim 15, wherein a total length of the feeding radiation element and the second radiation element is from 0.25 to 0.5 wavelength of the third frequency band.

18. The hybrid antenna structure as claimed in claim 15, wherein a length of the grounding radiation element is substantially equal to 0.25 wavelength of the fourth frequency band.

19. The hybrid antenna structure as claimed in claim 13, wherein a first coupling gap is formed between the grounding radiation element and the feeding radiation element, a width of the first coupling gap is smaller than or equal to 4 mm, a second coupling gap is formed between the grounding radiation element and the first radiation element, and a width of the second coupling gap is smaller than or equal to 2 mm.

20. The hybrid antenna structure as claimed in claim 1, wherein a length of the metal element is greater than 30 mm, and a width of the metal element is greater than 6 mm.

* * * * *